US008991543B2

(12) United States Patent
Nagakubo

(10) Patent No.: US 8,991,543 B2
(45) Date of Patent: Mar. 31, 2015

(54) STRADDLE TYPE VEHICLE

(71) Applicant: Honda Motor Co., Ltd., Tokyo (JP)

(72) Inventor: Akira Nagakubo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 132 days.

(21) Appl. No.: 13/922,807

(22) Filed: Jun. 20, 2013

(65) Prior Publication Data

US 2013/0341885 A1 Dec. 26, 2013

(30) Foreign Application Priority Data

Jun. 26, 2012 (JP) ................................ 2012-143087

(51) Int. Cl.

| | |
|---|---|
| ***B62K 11/00*** | (2006.01) |
| ***B62K 19/38*** | (2006.01) |
| ***B62K 21/02*** | (2006.01) |
| ***B62L 1/02*** | (2006.01) |
| ***B62L 1/00*** | (2006.01) |
| ***B62K 25/08*** | (2006.01) |

(52) U.S. Cl.

CPC . *B62L 1/00* (2013.01); *B62K 25/08* (2013.01); *B62K 19/38* (2013.01)

USPC ........ 180/219; 188/24.12; 188/344; 280/276; 280/279

(58) Field of Classification Search

USPC ............... 180/219, 227, 228, 230; 188/24.11, 188/24.12, 24.13, 344; 280/276, 279

See application file for complete search history.

(56) References Cited

U.S. PATENT DOCUMENTS

| | | | | |
|---|---|---|---|---|
| 4,878,558 | A * | 11/1989 | Asakura | 180/219 |
| 5,092,421 | A * | 3/1992 | Tsurumaki et al. | 180/219 |
| 5,419,625 | A * | 5/1995 | Iwase et al. | 303/116.1 |
| 5,427,208 | A * | 6/1995 | Motobu et al. | 188/24.13 |
| 6,325,169 | B1 * | 12/2001 | Tateshima et al. | 180/219 |
| 7,066,556 | B2 * | 6/2006 | Irie | 301/6.9 |
| 7,318,502 | B2 * | 1/2008 | Costa | 188/24.22 |
| 7,322,437 | B2 * | 1/2008 | Toyoda | 180/219 |
| 7,637,520 | B2 * | 12/2009 | Madden | 280/276 |
| 7,971,674 | B2 * | 7/2011 | Nimura et al. | 180/226 |
| 8,172,050 | B2 * | 5/2012 | Mikura et al. | 188/218 A |
| 8,393,430 | B2 * | 3/2013 | Matsuzawa | 180/219 |
| 2005/0023062 | A1 * | 2/2005 | Czysz | 180/219 |
| 2012/0247858 | A1 * | 10/2012 | Konno et al. | 180/219 |

FOREIGN PATENT DOCUMENTS

JP 2007-230376 9/2007

* cited by examiner

*Primary Examiner* — Joseph Rocca
*Assistant Examiner* — Marc A Scharich
(74) *Attorney, Agent, or Firm* — Rankin, Hill & Clark LLP

(57) ABSTRACT

In a straddle type vehicle having front forks, the left front fork is in an elliptical shape portion whose axial cross section is formed so as to be wider in the width direction of the vehicle as compared to a length in the front and rear direction at the portion located in front of the brake caliper. The brake caliper is disposed so as to be overlapped with the elliptical shape portion, viewed from the front direction of the vehicle.

15 Claims, 5 Drawing Sheets

STRADDLE TYPE VEHICLE

BACKGROUND OF THE INVENTION

1. Field of the Invention

The present invention relates to a straddle type vehicle comprising a front fork.

2. Description of Related Art

A straddle type vehicle having a brake caliper behind a front fork is widely known. See, for example, Japanese Laid-Open Patent Publication No. 2007-230376.

In the above-mentioned Japanese Laid-Open Patent Publication No. 2007-230376, the brake caliper is disposed behind the front fork. Simultaneously, a protector is disposed in front of the front fork. The protector prevents the front fork and the brake caliper from being hit directly by flying stones and the like from the front direction.

However, in a vehicle without a protector for reducing the number of components, it is needed to improve the brake caliper because the brake caliper hit by flying stones and the like tends to be damaged.

SUMMARY OF THE INVENTION

In the straddle type vehicle comprising the front fork, the present invention aims to reduce the impact on the brake caliper hit by flying stones and the like, which is disposed behind the front fork, without increasing the number of components.

In accordance with the present invention, a straddle type vehicle includes front forks rotatably supporting a front wheel and a brake caliper disposed behind the front forks. The front forks have wider portions, which are wider in the width direction of the vehicle at the portion located in front of the brake caliper compared to the length in the front and rear direction in the cross section of the axial direction. The brake caliper is disposed so as to be overlapped with the wider portions, as viewed from the front direction of the vehicle.

In further accordance with the present invention, the brake caliper is disposed further to an inner side in the width direction of the vehicle relative to the outermost side portion of the wider portions in the width direction of the vehicle.

Further, the front forks are erecting-type telescopic forks, and the wider portions are formed at the portion of the bottom case located at least in front of the brake caliper.

In further accordance with the present invention, a penetrating hole of an inner tube in the bottom case has a cross section in a perfect circular shape.

Further, the wider portions are off-centered and widened to the outer side in the width direction of the vehicle against a sliding axis. Also, the wider portions are formed such that the outer side in the width direction of the vehicle is thicker.

In further accordance with the present invention, the brake caliper is supported on only one of the front forks, and the wider portions are formed on the other of the front forks so as to be symmetrical to the one of the front forks.

According to the present invention, there is no need to provide a protector and the like for brake caliper separately, and it is possible to reduce the impact on the brake caliper hit by flying stones and the like from the front direction of the vehicle without increasing the number of components.

Further according to the present invention, the wider portions can be formed on the bottom case whose outer shape has a comparably high degree of freedom in an erecting-type front fork, which makes it easier to manufacture the front fork, as compared to the case that the wider portions are formed on the inner tube.

Also, the impact on the brake caliper hit by flying stones and the like can be reduced without the influence on the space on the inner side of the front fork in the width direction of the vehicle.

Furthermore, a motorcycle even with a single disk brake can maintain good rigidity balance between the right and left front forks.

BRIEF DESCRIPTION OF THE PREFERRED EMBODIMENT

DETAILED DESCRIPTION OF THE PREFERRED EMBODIMENTS

Figure 1:
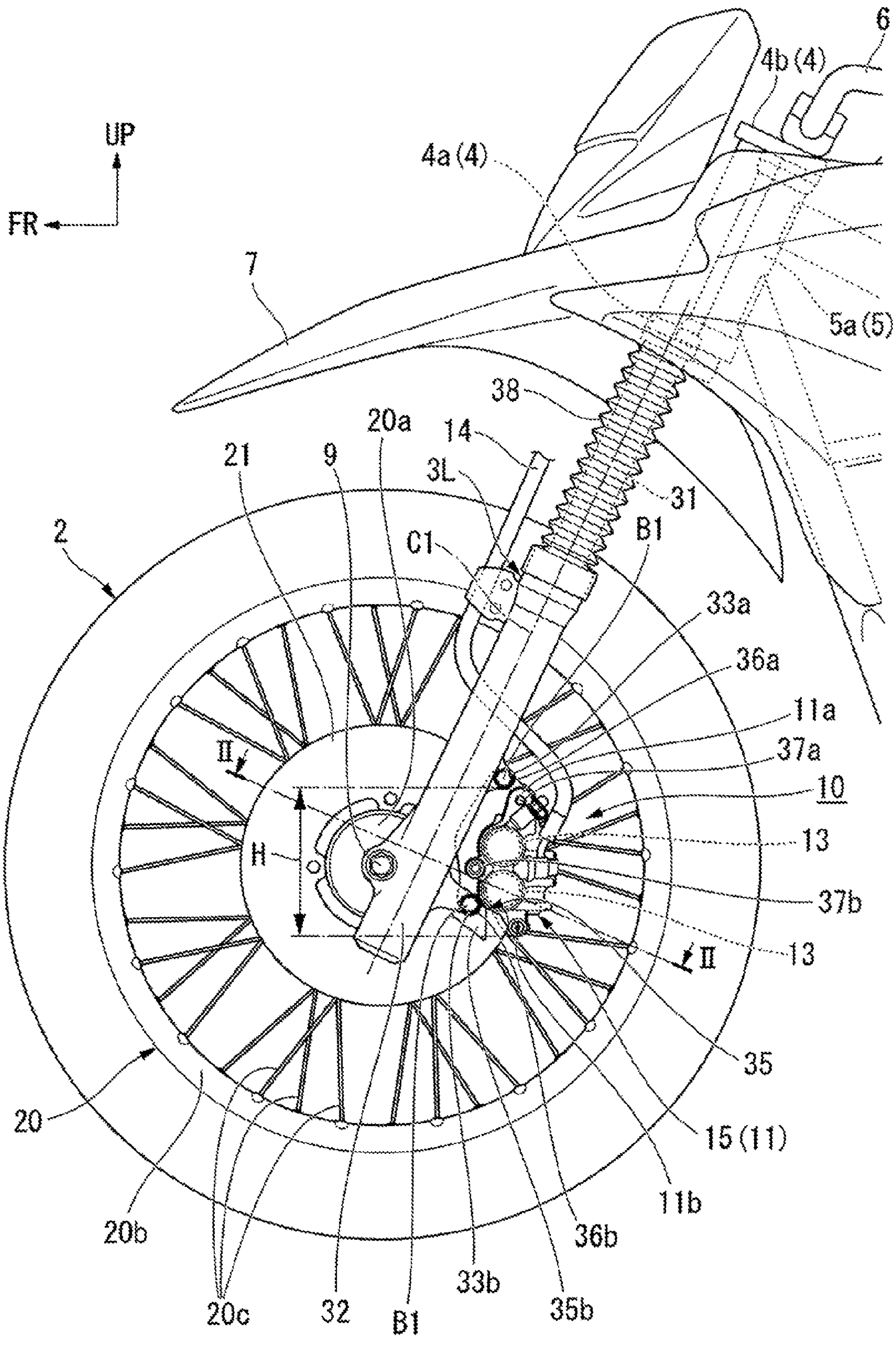
FIG. 1 is a left side view of the front portion of the vehicle body of the motorcycle in the embodiment of the present invention.

Hereinafter, the embodiment of the present invention will be explained with reference to drawings. In addition, the directions including "front-rear", "right-left" in the following explanation is as same as the directions of the vehicle which will be explained hereinafter if there is no specific description. Moreover, an arrow FR showing the front direction of the vehicle, an arrow LH showing the left direction of the vehicle, and an arrow UP showing the upper direction of the vehicle are located properly in the drawings which are used in the following explanation.

For example, FIG. 1 shows the front portion of the vehicle body of an off-road type motorcycle (a straddle type vehicle) 1. A front wheel 2 of the motorcycle 1 is axially supported on the lower end portions of right and left front forks 3L, 3R (See FIG. 2) as front suspensions. The right and left front forks 3L, 3R are erecting-type telescopic forks having an inner tube 31 in the upper side and an outer tube (a bottom case) 32 in the lower side, respectively. The upper portion of the right and left front forks 3L, 3R (an inner tube 31) is pivotally and steerably supported on a head pipe 5*a* at the front end of a body frame 5 through a steering stem 4.

A numeral 4*a* in the drawings shows a bottom bridge of the steering stem 4, a numeral 4*b* shows a top bridge of the steering stem 4, a sign C1 shows a center axis (a sliding axis) that is parallel to a head pipe 5*a* in the right and left front forks 3L, 3R, a numeral 6 shows a bar handle for steering that is mounted on the top bridge 4*b*, a numeral 7 shows front fenders spaced apart above the front wheel 2, and a numeral 9 shows a front wheel axis, respectively.

A front master cylinder (not shown) in a brake system of the motorcycle 1 is attached to the right grip portion of the bar handle 6. A front wheel brake 10 in the brake system has a hydraulic pressure supply source having the front master cylinder and the like; a front brake caliper (called as a brake caliper, hereinafter) 11 attached to the lower portion of the left front fork 3L; a front disk rotor (called as a disk rotor, hereinafter) 21 attached to the left side of a hub 20*a* of the front wheel 2. The front wheel 2 has a wire spoke wheel 20 connecting a hub 20*a* and rim 20*b* with a plurality of wire spokes 20*c*.

Figure 2:
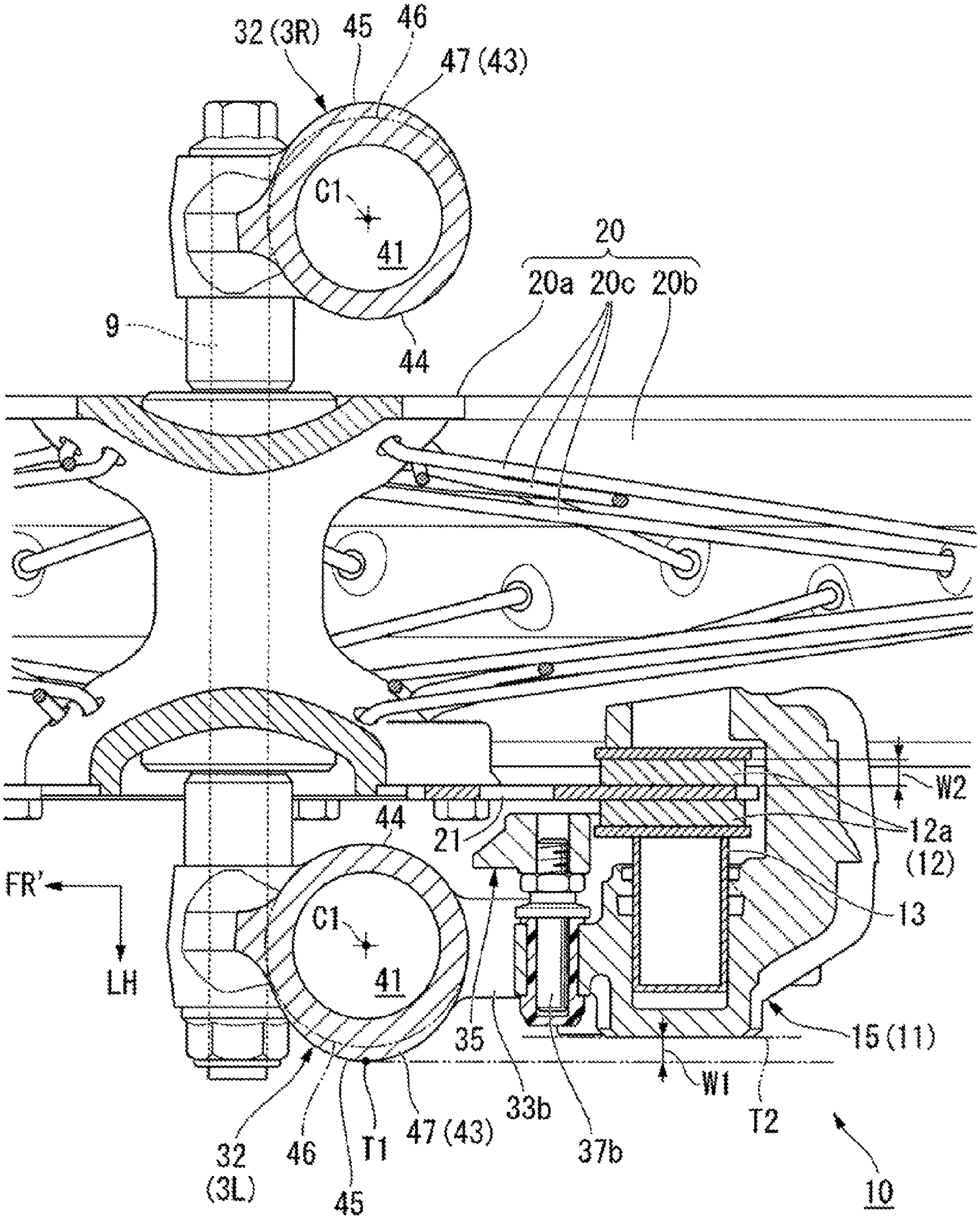
FIG. 2 is a sectional view taken along a line II-II in FIG. 1.

Also, with reference to FIG. 2, the front wheel brake 10 is a floating caliper type disk brake. That is, a brake caliper 11 is supported on a caliper bracket 35 that is fixed on the left front fork 3L so as to be slidable in the width direction of the vehicle, and simultaneously, has caliper pistons 13 pressing a pair of brake pads 12 to both side surfaces in the axial direction of a disk rotor 21 only on one side (left side) of the disk rotor 21. A brake caliper 11 is configured such that two caliper pistons 13 are arranged in a row in the rotation direction of the disk rotor 21. However, the brake caliper may have the configuration that includes a single or three or more caliper pistons 13. A numeral 14 in the drawings shows a brake hose connecting the hydraulic pressure supply source to the brake caliper 11.

The outer tubes 32 of the right and left front forks 3L, 3R are integrally formed respectively by casting, for example using aluminum alloy.

Upper and lower caliper attachment portions 33*a*, 33*b* projecting to the rear direction are integrally formed on the lower rear side of the outer tube 32 of the left front fork 3L.

The lower caliper attachment portion 33*b* is provided so as to increase the projecting amount to the rear direction more than the upper caliper attachment portion 33*a*. An oblong caliper bracket 35 is attached to these upper and lower caliper attachment portions 33*a*, 33*b* so as to bridge between the tip portions thereof.

Upper and lower fastening portions 36*a*, 36*b* are provided so as to be disposed on the inner side in the width direction of the vehicle of the upper and lower caliper attachment portions 33*a*, 33*b*, above and below the caliper bracket 35, respectively.

The upper and lower fastening portions 36*a*, 36*b* are fastened and fixed on the upper and lower caliper attachment portions 33*a*, 33*b* with bolts B1 that are parallel to the width direction of the vehicle (right and left direction), respectively.

An upper slide pin 37*a* is inserted behind an upper fastening portion 36*a* of the caliper bracket 35 such that the upper slide pin standing on the inner side in the width direction of the vehicle from an upper end portion 11*a* of the brake caliper 11 disposed on the outer side in the width direction of the vehicle. A lower slide pin 37*b* stands to the outer side in the width direction of the vehicle above the lower fastening portion 36*b* of the caliper bracket 35 such that the lower slide pin is inserted into the vertically middle portion of the brake caliper 11 disposed on the cuter side in the width direction of the vehicle. The brake caliper 11 is supported on the caliper bracket 35 slidably in the width direction of the vehicle through these upper and lower slide pins 37*a*, 37*b*.

The brake caliper 11 has a caliper body 15 supported on the caliper bracket 35 and disposed so as to straddle the disk rotor 21. The pair of brake pads 12 are held inside the caliper body 15 and disposed on both sides of the disk rotor and face the disk rotor in the axial direction of the disk rotor 21. The caliper piston 13 fitting into the inside of the outer side of the caliper body 15 in the width direction of the vehicle so as to be slidable in the width direction of the vehicle.

As for the brake caliper 11, when the hydraulic pressure is supplied from the hydraulic pressure supply source, the caliper piston 13 operates to press the brake pad 12 on the outer side in the width direction of the vehicle to the one side surface (outwardly facing side) of the disk rotor 21.

Simultaneously, the caliper body 15 is slid by the reaction force to the outer side direction in the width direction of the vehicle. The brake pad 12 on the inner side in the width direction of the vehicle is pulled to the other side surface (inwardly facing side) of the disk rotor 21. Accordingly, both of the brake pads 12 are pressed to the disk rotor 21 and generate the front wheel braking force.

The lower end portion 35*b* of the caliper bracket 35 is on the same level as the lower end portion 11*b* of the brake caliper 11 (the caliper body 15).

Figure 3:
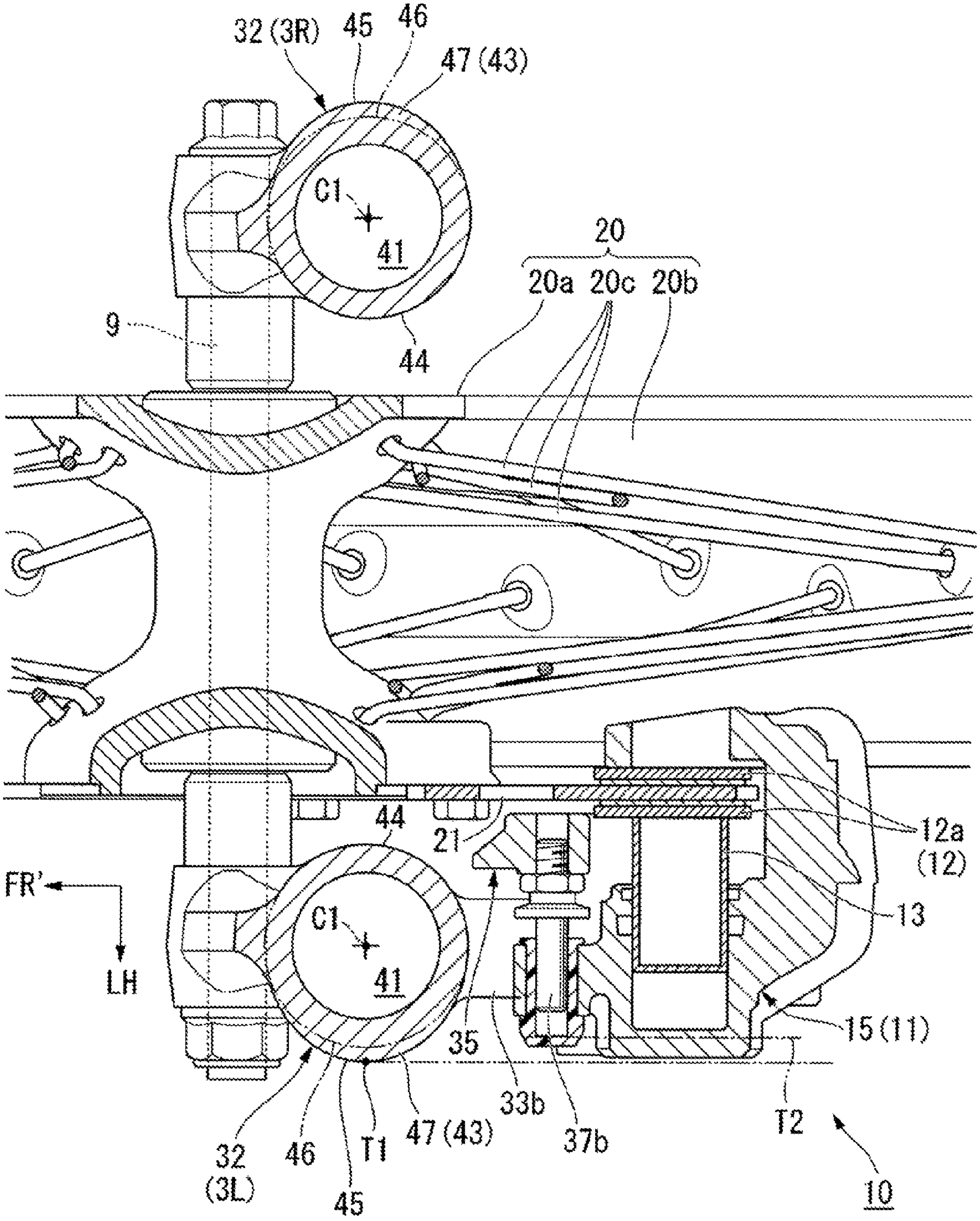
FIG. 3 is a sectional view corresponding to FIG. 2 in which the brake pad is in a worn state.

FIGS. 2 and 3 show a cross section perpendicular to an axis C1 (a cross section in the axial direction) at the portion located in front of the brake caliper 11 in the outer tube 32 of the left front fork 3L and the same cross sections of the outer tube 32 of the right front fork 3R and the like. An arrow FR' in the drawings shows the upper front direction in the cross sections in FIGS. 2 and 3.

As shown in FIGS. 1-3, the outer tube 32 of the right and left front forks 3L, 3R has a cylindrical shape straightly extending along the axis C1, forms an inner space portion 41 whose cross section is in a perfect circular shape inside thereof simultaneously, and forms an outer surface whose cross section is in an elliptical shape outside thereof. The cross sectional shape of the outside surface of the outer tube 32 is not a perfectly elliptical shape, but is in an approximately elliptical shape having a plurality of continuous circular arcs with different curvatures such that the width in the width direction (the right and left direction) of the vehicle is wider than that in the front and rear direction along the arrow FR'.

The lower portion of the cylindrical inner tube 31 having a cross section in a perfect circular shape is slidably inserted into the inner space portion 41 of the outer tube 32 along the axis C1. The upper end portion of the inner tube 31 is fastened with clamps on both of the right and left side portions of the bottom bridge 4*a* and on those of the top bridge 4*b* of the steering stem 4, respectively. A numeral 33 in FIG. 1 shows a fork boot in a bellow shape, which bridges between a lower end of the bottom bridge 4*a* and the upper end of the outer tube 32.

Each of the right and left front forks 3L, 3R house a damper as a damping mechanism and a coil spring and the like as a suspended spring (not shown). The outer tube 32 vertically moves along the axis C1 against the vehicle body having the front wheel 2 axially supported on the front lower portion thereof; the brake caliper 11 and the like which are supported on the lower rear portion thereof; and the inner tube 31, simultaneously.

An elliptical shape portion 43 is formed at the portion of the outer tube 32 of the left front fork 3L located at least in front of the brake caliper 11 (in the area between the upper and lower end portions 11*a*, 11*b* of the brake caliper 11 in the vertical direction: shown by a sign H in FIG. 1), such that the cross section thereof in the axial direction with an approximately elliptical shape as mentioned above. The elliptical shape portion 43 is formed so as to be off-centered and widened to the outer side in the width direction of the vehicle against the axis C1. Specifically, the outer surface 44 on the inner side in the width direction of the vehicle of the elliptical shape portion 43 is formed with the cross section in a perfect circular shape, centered on the axis C1.

On the other hand, the outer surface 45 on the outer side in the width direction of the vehicle of the elliptical shape portion 43 is formed so as to swell to the outer side in the width direction of the vehicle, setting the outermost side portion T1 in the width direction of the vehicle as the top portion. The elliptical shape portion 43 may be formed so as to be along the full length of the outer tube 32.

The inner side of the elliptical shape portion 43 in the width direction of the vehicle is formed with a generally constant thickness (i.e., the same thickness). The outer side of the elliptical shape portion 43 in the width direction of the vehicle is formed such that the thickness thereof is largest at the outermost side portion T1 in the width direction of the vehicle and then is gradually reduced in the front and the rear of the outermost side portion thereof. In other words, a swelling portion (hereinafter, it is called as a thickness portion 47) is formed on the outer side of the outer tube 32 (the elliptical shape portion 43) in the width direction of the vehicle, such that the swelling portion swelling to further outer side in the width direction of the vehicle relative to a reference surface 46 having the same diameter with the outer surface 44 on the inner side in the width direction of the vehicle.

With reference to FIG. 2, the outermost side portion T1 of the outer tube 32 is located on further outer side in the width direction of the vehicle relative to the outermost side portion T2 of the brake caliper 11 in the width direction of the vehicle, as much as the width W1. This reduces the impact on the brake caliper 11 hit by flying stones and the like from the front direction of the vehicle.

FIG. 2 shows a state that the pad main body (friction material) 12*a* of the brake pad 12 has a thickness W2 corresponding to that of a new or almost new brake pad. In this state, the width W1 and the thickness W2 is in a relationship: "W1≥W2".

Therefore, as shown in FIG. 3, even if the thickness of the pad main body 12*a* of the brake pad 12 is reduced and the caliper body 15 is moved to the outer side in the width direction of the vehicle, the outermost side portion T2 of the brake caliper 11 may not be swelled to further outer side in the width direction of the vehicle relative to the outermost side portion T1 of the outer tube 32. As above-mentioned, the outer tube 32 of the left front fork 3L has been explained. However, the outer tube 32 of the right front fork 3R without the brake caliper 11 also has the same cross section in the axial direction. Accordingly, the rigidity and the like between the right and left front forks 3L, 3R can be equalized.

As above-mentioned, the motorcycle 1 in the present embodiment is the straddle type vehicle comprising right and left front forks 3L, 3R rotatably supporting the front wheel 2 and the brake caliper 11 disposed behind the left front fork 3L. The left front fork 3L is in an elliptical shape portion 43 whose cross section in the axial direction is in an elliptical shape formed so as to be wider in the width direction of the vehicle at the portion located in front of the brake caliper 11, the brake caliper 11 is disposed so as to be overlapped with the elliptical shape portion 43, viewed from the front direction of the vehicle, and is disposed on further inner side in the width direction of the vehicle relative to the outermost side portion T1 of the elliptical shape portion 43 in the width direction of the vehicle.

In the other words, the above-mentioned motorcycle 1 has the thickness portion 47 formed so as to swell to further outer side in the width direction of the vehicle relative to the outermost side portion T2 of the brake caliper 11 in the width direction of the vehicle at the portion located in front of the brake caliper 11 in the left front fork 3L.

According to the above-mentioned configuration, there is no need to provide a protector and the like for the brake caliper 11 separately, and it is possible to reduce the impact on the brake caliper 11 hit by flying stones and the like from the front direction of the vehicle without increasing the number of components.

The above-mentioned motorcycle 1 includes right and left front forks 3L, 3R, which are erecting-type telescopic fork. In the outer tube 32, the inner space portion 41 into which the inner tube 31 is inserted has a cross section in a perfect circular shape. The elliptical shape portion 43 (the thickness portion 47) is formed at the portion located in front of the brake caliper 11 in the outer tube 32.

With this structure, the elliptical shape portion 43 (the thickness portion 47) can be formed on the outer tube 32 whose outer shape has a comparably high degree of freedom in the erecting-type right and left front forks 3L, 3R. This makes it easier to manufacture the right and left front forks 3L, 3R, comparing to the case that the elliptical shape 43 (the thickness portion 47) is formed on the inner tube 31.

The above-mentioned motorcycle 1 includes the elliptical shape portion 43 formed so as to be off-centered and widened to the outer side in the width direction of the vehicle against the axis C1, are formed such that the outer side in the width direction of the vehicle is thicker (the thickness portion 47 is formed on the outer side of the outer tube 32 in the width direction of the vehicle). With this structure, the impact on the brake caliper 11 hit by flying stones and the like can be reduced without the influence on the inner space between the right and left front forks 3L, 3R in the width direction of the vehicle.

The above-mentioned motorcycle 1 includes the brake caliper 11 supported on only the left front fork 3L. However, the elliptical shape portion 43 is preferably also formed on the right front fork 3R so as to be symmetrical to the left front fork 3L. With this structure, the motorcycle 1 even with a single disk brake can maintain good rigidity balance between the right and left front forks 3L, 3R.

In addition, the present invention is not limited to that of the above-mentioned embodiment. For example, the variation of the cross sectional shape of the outer tube 32 shown in FIGS. 2 and 3 can be possible.

Figure 4:
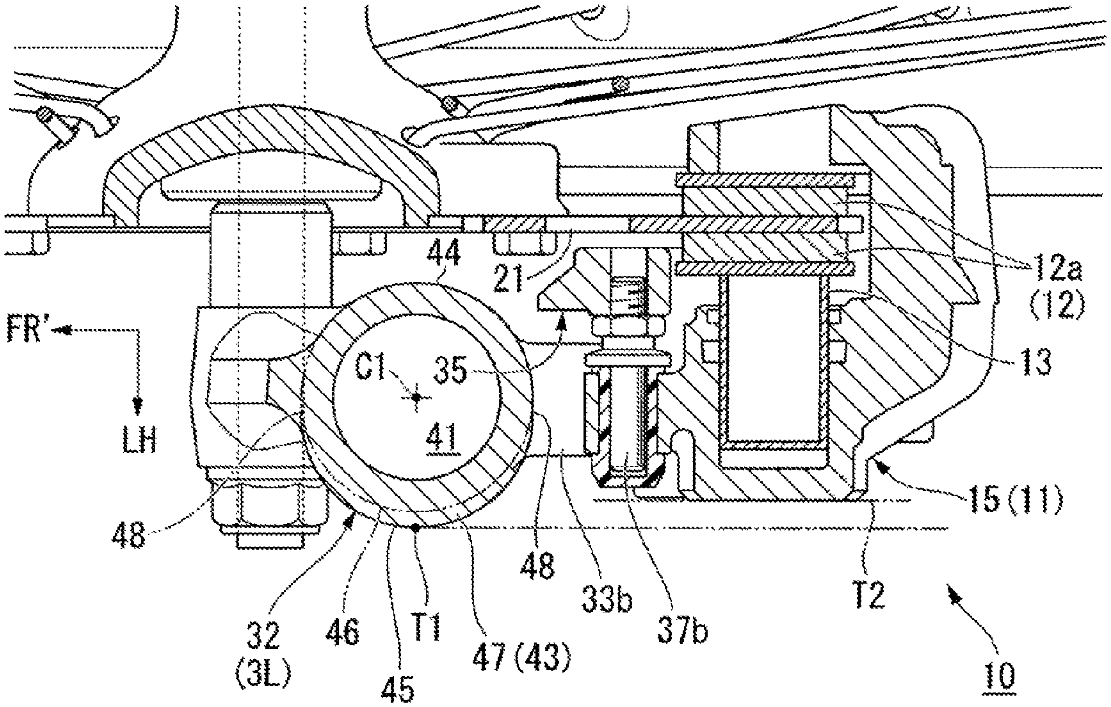
FIG. 4 is a sectional view corresponding to the part of FIG. 2 showing the first variation of the present embodiment.

For instance, FIG. 4 shows an example in which the elliptical shape portion 43 includes straight line portions 48 on the front and rear portions of the elliptical shape portion to form an approximately elliptical shape, not only using the curve lines.

Figure 5:
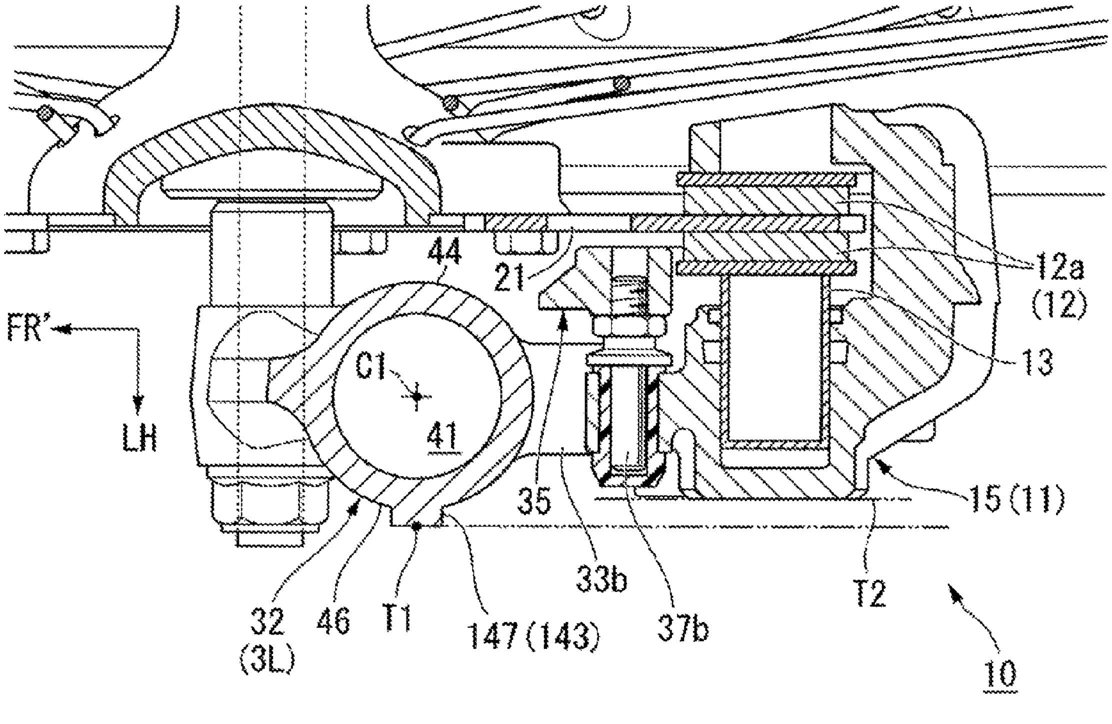
FIG. 5 is a sectional view corresponding to FIG. 4 showing the second variation of the present embodiment.

On the other hand, FIG. 5 shows an example in which a rib forming portion 143 is provided so as to have a rib 147 projecting from a reference surface 46 to the outside in the width direction of the vehicle instead of the elliptical shape portion 43.

Figure 6:
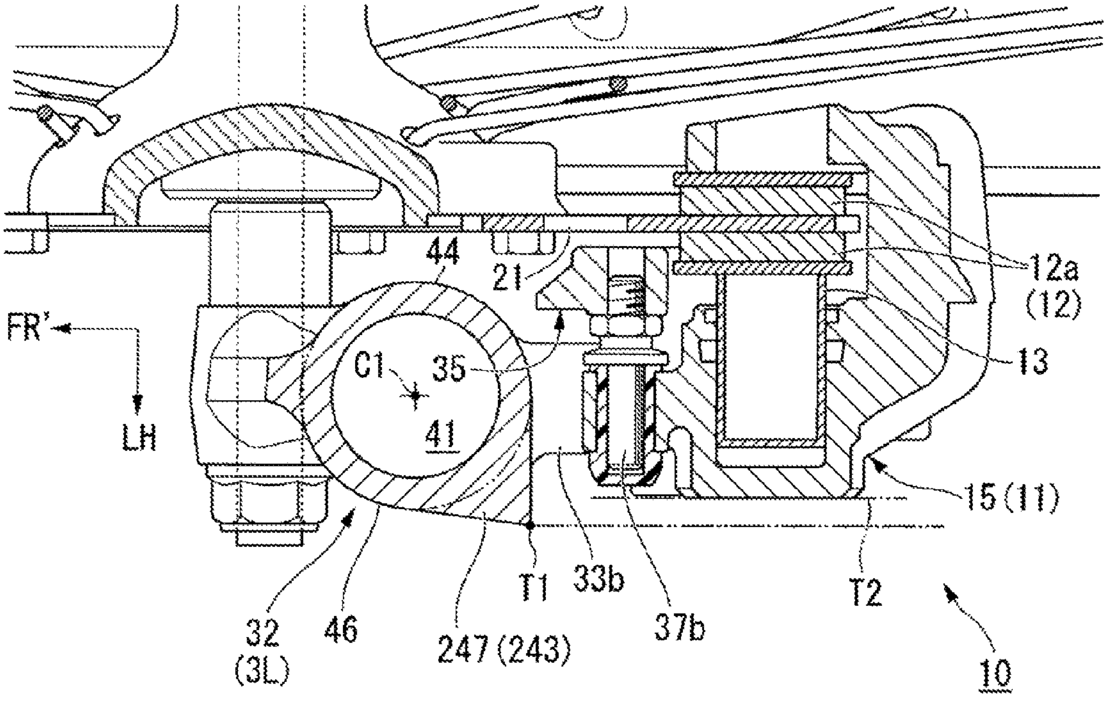
FIG. 6 is a sectional view corresponding to FIG. 4 showing the third variation of the present embodiment.

Moreover, FIG. 6 shows an example in which an irregular-shape cross sectional portion 243 is provided so as to have a triangular shape portion 247 projecting from the reference surface 46 to the outside in the width direction of the vehicle and to the rear direction, instead of the elliptical shape portion 43.

Figure 7:
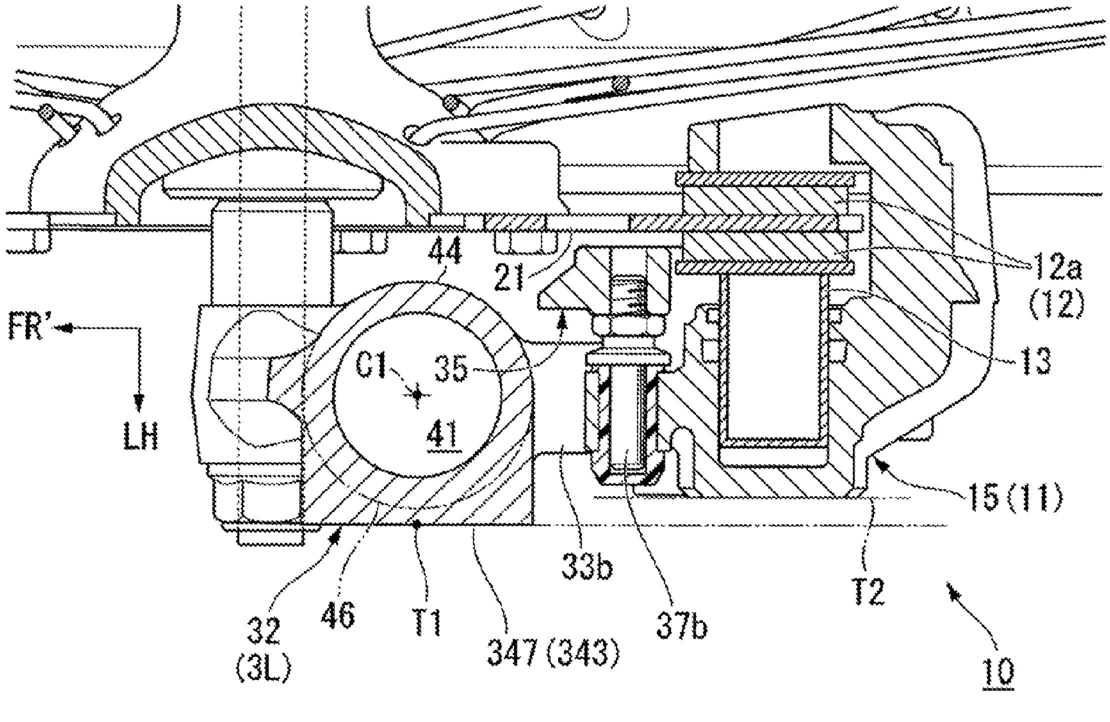
FIG. 7 is a sectional view corresponding to FIG. 4 showing the fourth variation of the present embodiment.

Furthermore, FIG. 7 shows an example in which an irregular-shape cross sectional portion 343 is provided so as to have a rectangular-shape portion 347 projecting from the reference surface 46 to the outside in the width direction of the vehicle, instead of the elliptical shape portion 43.

In addition, an inverted-type telescopic fork in which an outer tube is in the upper side and an inner tube is in the lower side may be applied. In this case, the inner tube located in front of the brake caliper has a cross section in an elliptical shape. In contrast, in the case of the erecting-type telescopic fork in which the outer tube 32 is formed by casting and the like as the above-mentioned embodiment, it is easy to have an elliptical-shaped cross section in the axial direction and to form the thickness portion 47 on the outer side in the width direction of the vehicle. Simultaneously, it may have a high degree of freedom for molding. The straddle type vehicle includes the vehicles in general that a driver straddles the vehicle body for riding such as a three-wheeled or a fourwheeled vehicle in addition to a motorcycle (a motorized bicycle or a scooter type vehicle).

Then, the configuration in the above-mentioned embodiment is an example of the present invention. Various changes can be applied without deviation from the scope of claims of the present invention.

Explanations of Letters or Numerals

1 motorcycle (straddle type vehicle)
2 front wheel
3L left front fork (front fork)
3R right front fork (front fork)
11 brake caliper
32 outer tube (bottom case)
43 elliptical shape portion (wider portion)
47 thickness portion (swelling portion)
143 rib forming portion (wider portion)
147 rib (swelling portion)
243, 343 irregular-shape cross sectional portion (wider portion)
247 triangular-shape portion (swelling portion)
347 rectangular-shape portion (swelling portion)
T1, T2 outermost side portion
C1 sliding axis

What is claimed is:

1. A straddle type vehicle, comprising:
front forks rotatably supporting a front wheel, and
a brake caliper disposed behind said front forks,
wherein said front forks have portions, located in front of said brake caliper, that are wider in a width direction than in a length direction, said length direction being measured in a cross section perpendicular to an axial direction of the front forks and extending generally forwards and backwards of the vehicle and said width direction being perpendicular to said length direction, perpendicular to said axial direction, and generally extending in a width direction of the vehicle,
wherein said wider portions are off-centered and widened to an outer side of each front fork in the width direction of the vehicle relative to a center axis defined by each front fork, and,
wherein said brake caliper is disposed so as to be overlapped with said wider portions, as viewed in the length direction from a front of the vehicle.

2. The straddle type vehicle according to claim 1, wherein said front forks are erecting typo telescopic forks, and said wider portions are formed at a portion of a bottom case of said front forks that is located in front of the brake caliper.

3. The straddle type vehicle according to claim 2, wherein a penetrating hole of an inner tube in said bottom case has a cross section in a circular shape.

4. The straddle type vehicle according to claim 3, wherein said wider portions are formed such that the outer side of each front fork in the width direction of the vehicle is relatively thicker than an inner side of each front fork in the width direction.

5. The straddle type vehicle according to claim 2, wherein said wider portions are formed such that the outer side of each front fork in the width direction of the vehicle is relatively thicker than an inner side of each front fork in the width direction.

6. The straddle type vehicle according to claim 2, wherein the brake caliper is supported on only one of said front forks, said wider portions formed on said front forks are symmetrical to each other.

7. The straddle type vehicle according to claim 3, wherein the brake caliper is supported on only one of said front forks, said wider portions formed on said front forks are symmetrical to each other.

8. The straddle type vehicle according to claim 1, wherein said brake caliper is disposed further inwardly, in the width direction of the vehicle, relative to an outermost side portion of said wider portions.

9. The straddle type vehicle according to claim 8, wherein said front forks are erecting telescopic forks, and said wider portions are formed at least at a portion of a bottom case of said front forks that is located in front of the brake caliper.

10. The straddle type vehicle according to claim 9, wherein a penetrating hole of an inner tube in said bottom case has a cross section in a circular shape.

11. The straddle type vehicle according to claim 8, wherein said wider portions are formed such that the outer side of each front fork in the width direction of the vehicle is relatively thicker than an inner side of each front fork in the width direction.

12. The straddle type vehicle according to claim 8, wherein the brake caliper is supported on only one of said front forks, said wider portions formed on said front forks are symmetrical to each other.

13. The straddle type vehicle according to claim 1, wherein said wider portions are formed such that the outer side of each front fork in the width direction of the vehicle is relatively thicker than an inner side of each front fork in the width direction.

14. The straddle type vehicle according to claim 1, wherein the brake caliper is supported on only one of said front forks, said wider portions formed on said front forks are symmetrical to each other.

15. A straddle type vehicle comprising:
front forks rotatably supporting a front wheel, and
a brake caliper disposed behind one of said front forks,
wherein said one of said front forks is formed so as to have a cross section perpendicular to an axial direction thereof be wider in a width direction of the vehicle than in a length direction of the vehicle, said length direction extending in a front and rear direction of the vehicle and being perpendicular to said width direction of the vehicle, said brake caliper being disposed further to an inner side of said one of said front forks in the width direction of the vehicle than an outermost side portion of said one of said front forks in the width direction of the vehicle such that said brake caliper is disposed behind and protected by said one of said front forks,
wherein said outermost side portion of said one of said front forks in the width direction of the vehicle is relatively thicker than the inner side of said one of said front forks in the width direction of the vehicle.

* * * * *